(12) United States Patent
Kumar

(10) Patent No.: US 11,967,127 B2
(45) Date of Patent: Apr. 23, 2024

(54) CONTEXT EMBEDDING FOR CAPTURING IMAGE DYNAMICS

(71) Applicant: Sony Interactive Entertainment Inc., Tokyo (JP)

(72) Inventor: Komath Naveen Kumar, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 258 days.

(21) Appl. No.: 16/382,705

(22) Filed: Apr. 12, 2019

(65) Prior Publication Data

US 2019/0325273 A1 Oct. 24, 2019

Related U.S. Application Data

(60) Provisional application No. 62/659,639, filed on Apr. 18, 2018.

(51) Int. Cl.
*G06V 10/44* (2022.01)
*G06F 18/21* (2023.01)
(Continued)

(52) U.S. Cl.
CPC .......... *G06V 10/454* (2022.01); *G06F 18/217* (2023.01); *G06F 18/22* (2023.01); *G06F 18/24* (2023.01); *G06T 7/0016* (2013.01); *G06V 10/776* (2022.01); *G06V 10/82* (2022.01); *G06V 40/176* (2022.01); *G06T 2207/20081* (2013.01);
(Continued)

(58) Field of Classification Search
CPC . G06N 3/02; G06N 3/08; G06N 3/088; G06T 2207/20084
See application file for complete search history.

(56) References Cited

U.S. PATENT DOCUMENTS 9,904,866 B1   2/2018 Noble
10,248,663 B1* 4/2019 Keisler ............... G06F 16/5854
(Continued)

FOREIGN PATENT DOCUMENTS

WO    2016033458 A1    3/2016

OTHER PUBLICATIONS

Villegas et al., "Decomposing Motion and Content for Natural Video Sequence Prediction", Jan. 8, 2018, arXiv.org, <https://arxiv.org/abs/1706.08033>, p. 1-22. (Year: 2018).*
(Continued)

*Primary Examiner* — Vincent Rudolph
*Assistant Examiner* — Timothy Choi
(74) *Attorney, Agent, or Firm* — JDI PATENT; Joshua D. Isenberg; Robert Pullman

(57) ABSTRACT

Systems and methods capture image dynamics and use those captured image dynamics for image feature recognition and classification. Other methods and systems train a neural network to capture image dynamics. An image vector representing image dynamics is extracted from an image of an image stream using a first neural network. A second neural network, predicts a previous and/or subsequent image in the image stream from the image vector. The predicted previous and/or subsequent image is compared with an actual previous and/or subsequent image from the image stream. The first and second neural networks are trained using the result of the comparison.

19 Claims, 6 Drawing Sheets

(51) Int. Cl.
*G06F 18/22* (2023.01)
*G06F 18/24* (2023.01)
*G06T 7/00* (2017.01)
*G06V 10/776* (2022.01)
*G06V 10/82* (2022.01)
*G06V 40/16* (2022.01)

(52) U.S. Cl.
CPC ............. *G06T 2207/20084* (2013.01); *G06V 2201/03* (2022.01)

(56) References Cited

U.S. PATENT DOCUMENTS

| | | | | |
|---|---|---|---|---|
| 2016/0328643 | A1* | 11/2016 | Liu | G06N 3/084 |
| 2017/0249739 | A1* | 8/2017 | Kallenberg | G06K 9/4628 |
| 2017/0255832 | A1* | 9/2017 | Jones | G06V 10/454 |
| 2019/0035113 | A1* | 1/2019 | Salvi | G06N 3/08 |
| 2019/0138889 | A1* | 5/2019 | Jiang | G06T 7/251 |

OTHER PUBLICATIONS

Su et al., "Exploring Microscopic Fluctuation of Facial Expression for Mood Disorder Classification", Dec. 2017, IEEE, 2017 International Conference on Orange Technologies (ICOT), p. 65-69. (Year: 2017).*
Soomro et al., "UCF101: A Dataset of 101 Human Actions Classes From Videos in The Wild", Dec. 2012, arXiv.org, <https://arxiv.org/abs/1212.0402>, p. 1-7. (Year: 2012).*
Xue et al. "Visual Dynamics: Probabilistic Future Frame Synthesis via Cross Convolutional Networks", Dec. 2016, ACM, NIPS'16: Proceedings of the 30th International Conference on Neural Information Processing Systems, p. 91-99. (Year: 2016).*
Chen et al. "Long-Term Video Interpolation with Bidirectional Predictive Network", Dec. 2017, IEEE, 2017 IEEE Visual Communications and Image Processing (VCIP), p. 1-4 (Year: 2017).*
Liu et al., "Video Frame Synthesis using Deep Voxel Flow", Oct. 2017, IEEE, 2017 IEEE International Conference on Computer Vision (ICCV), p. 4473-4481. (Year: 2017).*
Sun et al., "Learning a Convolutional Neural Network for Non-uniform Motion Blur Removal", Jun. 2015, IEEE, 2015 IEEE Conference on Computer Vision and Pattern Recognition (CVPR), p. 769-777. (Year: 2015).*
Masci, Jonathan, et al. "Stacked Convolutional Auto-Encoders for Hierarchical Feature Extraction." ICANN 2011, 2011, pp. 52-59., doi:10.1007/978-3-642-21735-7_7.
Mikolov, Tomas, et al. "Distributed Representations of Words and Phrases and Their Compositionality." [1310.4546] Distributed Representations of Words and Phrases and Their Compositionality, Oct. 16, 2013.
Perronnin, Florent, "Output Embedding for Large Scale visual Recognition." CVSPR tutorial: Large Scale Visual Recognition. Jun. 28, 2014.
Ranzato, Marc'Aurelio "Large Scale Visual Recognition Part IV: Deep Learning" Facebook A.I. research Jun. 28, 2014.
Schroff, Florian, et al. "FaceNet: A Unified Embedding for Face Recognition and Clustering." [1503.03832] FaceNet: A Unified Embedding for Face Recognition and Clustering, Jun. 17, 2015.
Simonyan, Karen, and Andrew Zisserman. "Very Deep Convolutional Networks for Large-Scale Image Recognition." [1409.1556] ICANN, Apr. 10, 2015.
United States Provisional U.S. Appl. No. 62/659,639, to Naveen Kumar filed Apr. 18, 2019.
Vedaldi, Andrea "Input embedding, from shallow to deep" CVPR Tutorial on Large Scale Recognition 2014.
Wang, Zhangyang, et al. "Self-Tuned Deep Super Resolution." [1504.05632] Self-Tuned Deep Super Resolution, Apr. 22, 2015.
International Search Report and Written Opinion dated Jul. 5, 2019 for International Patent Application No. PCT/US19/27199.

* cited by examiner

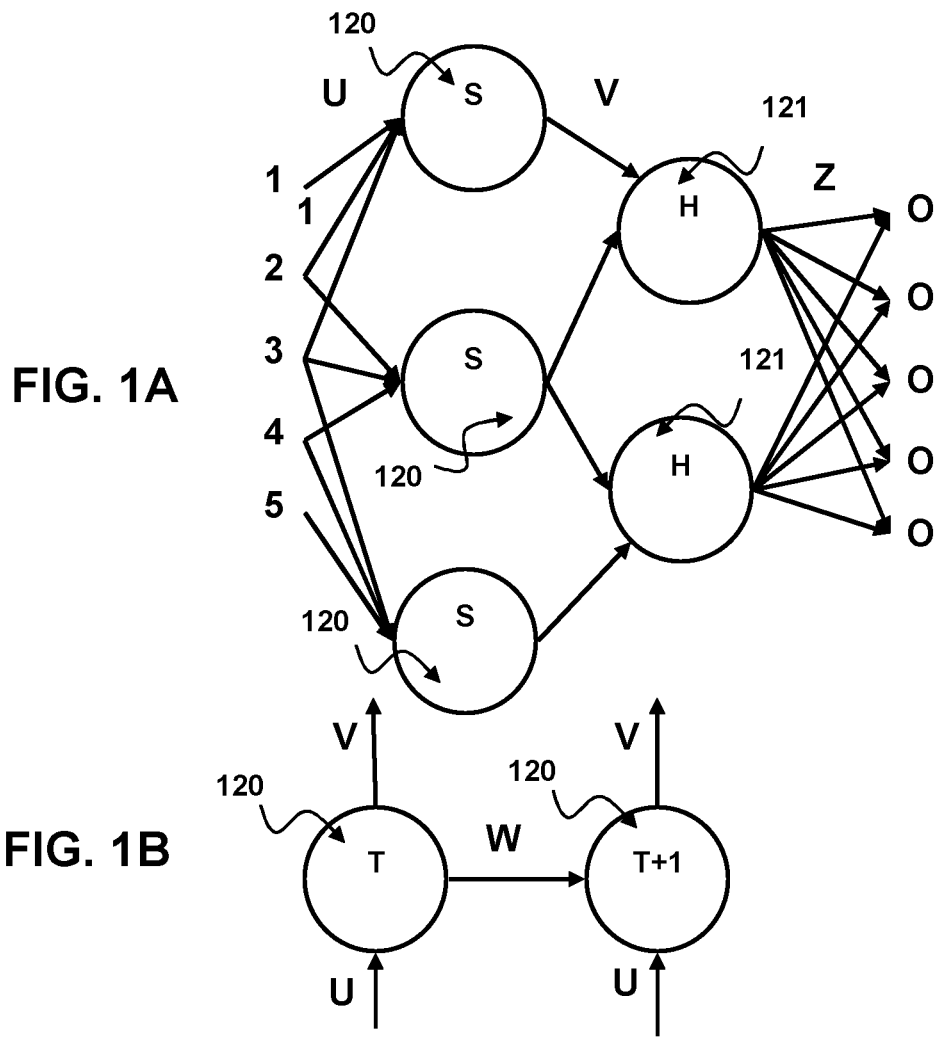
FIG. 1A
FIG. 1B
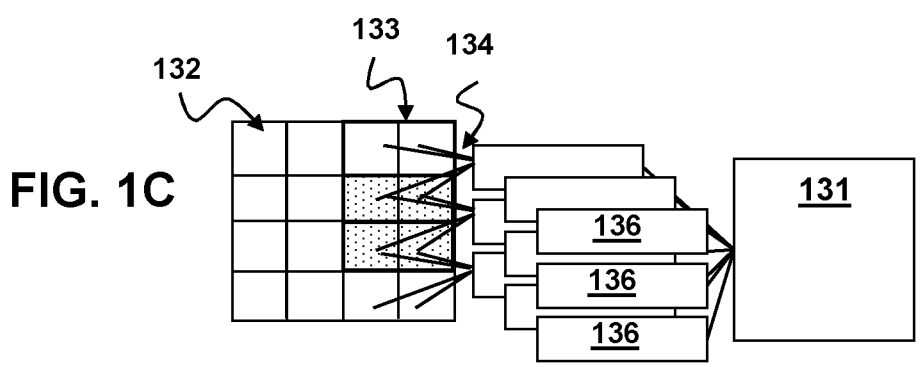
FIG. 1C

CONTEXT EMBEDDING FOR CAPTURING IMAGE DYNAMICS

CLAIM OF PRIORITY

This application claims the priority benefit of U.S. Provisional Patent Application No. 62/659,639, filed Apr. 18, 2019, the entire contents of which are incorporated herein by reference.

FIELD OF THE INVENTION

This Application relates to image recognition and classification. More specifically the current Application relates to a system that can automatically learn features for image dynamic recognition.

BACKGROUND OF THE INVENTION

Conventionally neural networks are trained using data having known labels for features known as supervised learning as in Schoff et al. "Facenet: A Unified Embedding for Face Recognition and Clustering" In Proceedings of the IEEE Conference on computer vision and pattern recognition, pg. 1-5, 2015. Supervised learning thus relies on features selected by the creator to enable prediction at runtime. A major drawback of this is that a neural network being trained by supervised learning may not learn anything from training data in the form of images that are closely related to each other such as those in a video stream. In supervised learning it is quite difficult for the creator to select features and labels with fine enough granularity to detect changes within a video stream. Thus it would be advantageous to create an image recognition system that can learn feature data for labeling at a fine enough granularity, that changes in video images can be detected.

One field of research that is ongoing in neural networks is in unsupervised training. Unsupervised training allows networks determine features from unaltered data and avoid local minima while increasing network stability. Most methods for unsupervised learning use an auto-encoder and decoder set-up. In an auto-encoder-decoder input information is first transformed into a smaller form by the encoder and then expanded to reproduce the initial data in the decoder. (See Masci, Jonathan et al. "Stacked Convolutional Auto-Encoders for Hierarchical Feature Extraction" In ICANN, pages 52-59. 2011).

It is within this context that the present disclosure arises.

BRIEF DESCRIPTION OF THE DRAWINGS

The teachings of the present disclosure can be readily understood by considering the following detailed description in conjunction with the accompanying drawings, in which:

FIG. 1A is a simplified node diagram of a recurrent neural network for according to aspects of the present disclosure.

FIG. 1B is a simplified node diagram of an unfolded recurrent neural network for according to aspects of the present disclosure.

FIG. 1C is a simplified diagram of a convolutional neural network for according to aspects of the present disclosure.

DESCRIPTION OF THE SPECIFIC EMBODIMENTS

Figure 2:
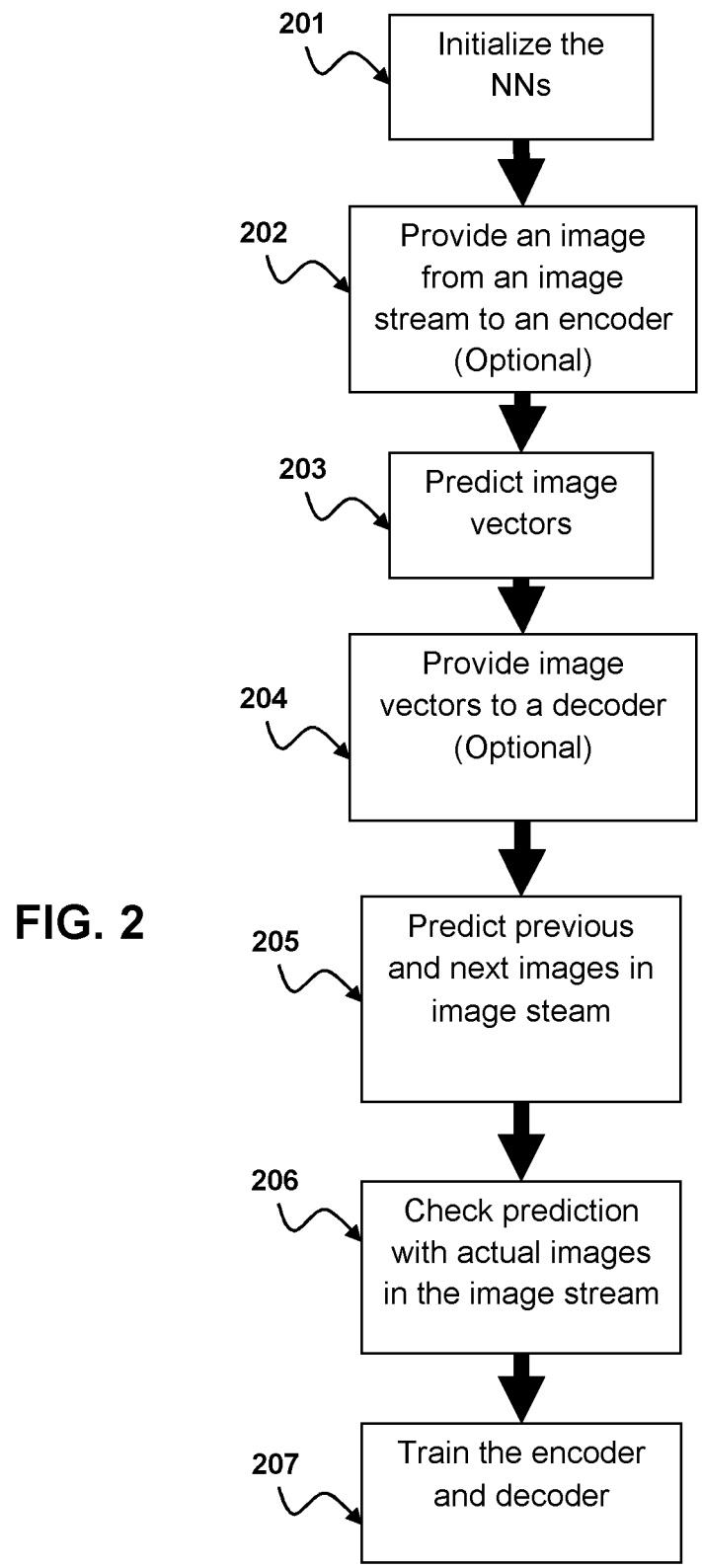
FIG. 2 is a block diagram of a method for training an auto-encoder for detection of image dynamics according to an aspect of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Overview

In standard image recognition systems, a neural network is trained to discriminate between differing image features such as the identity of faces or objects within the images. These discriminatory recognition systems often have difficulty in detection of small changes within an image hereinafter referred to as image dynamics. According to aspects of the present disclosure, image dynamics may efficiently represent subtle changes in appearance and changes in expression. By way of example and not by way of limitation a change in expression may be a change in the appearance of mouth shape during speech, a smile or frown or the furrowing of the brow or a shrug. Additionally by way of example and not by way of limitation image dynamics include gradual changes in appearance such as the appearance or disappearance of scars or the loss of muscle. Aspects of the present disclosure are not limited to implementations involving facial features. By way of example and without limitation a change in appearance may also encompass the gradual appearance of medical conditions such as the growth of a tumor or the blackening of an organ due to necrosis as seen in a sequence of medical diagnostic images.

An insight of the inventors behind the present disclosure is that facial images and in general images of a person's body can be considered as slowly varying over time. As such a network embedding that can capture the relationship between adjacent frames of images in an image stream (i.e. a video) is able to create a good representation for tasks that use image dynamics such as speech recognition and expression recognition. Thus an image recognition system which encodes/captures image dynamics for expression or speech recognition is disclosed.

Training

According to aspects of the present disclosure, an image dynamic detection system may comprise two components, an auto-encoder neural network and a neural network for recognition. The auto-encoder neural network outputs feature length image vectors and the neural network for recognition uses those feature length image vectors to detect image dynamics, e.g., for for expression or speech recognition.

Each neural network may be any type known in the art but preferably the neural network is a Convolutional Neural Network (CNN). In an alternative embodiment the CNN is a Convolutional Recurrent Neural Network (CRNN) of any type.

FIG. 1A depicts the basic form of an CNN having a layer of nodes 120, each of which is characterized by an activation function S, one input weight U, and an output transition weight V. It should be noted that the activation function S may be any non-linear function known in the art and is not limited to the (hyperbolic tangent (tanh) function. For example the activation function S may be a Sigmoid or ReLu function. A feature of CNNs is the addition of hidden layers 121 to the output of a first node layer 120 creating a hierarchical type structure. A CNN may have any number of hidden layers and the hidden layers may have different activation function H and output transition weight Z than the initial node layer 120. Additionally the initial node layer 120 in a CNN is not fully connected across all inputs and instead operates on a window of inputs as discussed in FIG. 1C. Operating on only a window of inputs allows the CNN to better maintain spatial information than a traditional fully connected NN. Later hidden layers may combine outputs from all nodes in a window of the previous layer; this type of layer is known as a pooling layer. A max pooling layer is another specialized hidden layer similar to a pooling layer except it only values the highest weighted input from the previous layer within a window. The design of CNNs is highly dependent on the purpose for which is chosen and the number of nodes, layers, layer types and activation functions are variable and require optimization through experimentation.

As shown in FIG. 1B a recurrent neural network layer adds a recurrent node transition W which returns the value from the previous iteration to the current node. Thus a recurrent layer may be considered as a series of nodes 120 having the same activation function moving through time T and T+1. Thus the RNN maintains historical information by feeding the result from a previous time T to a current time T+1. A CNN may implement node layers of the recurrent type. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997)

FIG. 1C depicts an example layout of a convolution neural network for image recognition. In this depiction the convolution neural network is generated for an image 132 with a size of 4 units in height and 4 units in width giving a total area of 16 units. The depicted convolutional neural network has a filter 133 size of 2 units in height and 2 units in width with a skip value of 1 and a channel 136 size of 9. (For clarity in depiction only the connections 134 between the first column of channels and their filter windows is depicted.) The convolutional neural network according to aspects of the present disclosure may have any number of additional neural network node layers 131 and may include such layer types as additional convolutional layers, fully connected layers, pooling layers, max pooling layers, local contrast normalization layers, etc. of any size.

FIG. 2 shows the method for training the encoder for image dynamic recognition. Training a neural network (NN) begins with initialization 201 of the weights of the NN. The initial weights depend on the type of activation function and number of inputs to the node. The initial weights for an NN cannot be 0 because that would result in asymmetric calculations in the hidden layers. In general the initial weights should be distributed randomly. For example an NN with a tanh activation function should have random values distributed between $$-\frac{1}{\sqrt{n}} \text{ and } \frac{1}{\sqrt{n}}$$

where n is the number of inputs to the node.

After initialization an image from an image stream is provided to an encoder neural network 202. The image stream may be any type known in the art as long as there is sufficient temporal correlation between subsequent images and a large amount of actual similarity, exemplary image stream types are without limitation: video streams, time lapse photography, slow motion photography etc. In some implementations, the image provided may have certain areas selected for extraction of an image vector and prediction. Such selected areas may correspond to specific features, such as faces or portions thereof. In some implementations, the image and the stream of images may have undergone video encoding before being provided to the encoder neural network.

An auto-encoder is neural network is trained using a method called unsupervised learning. In unsupervised learning an encoder NN is provided with a decoder NN counterpart and the encoder and decoder are trained together as single unit. The basic function of an auto-encoder is to take an input x which is an element of $R^d$ and map it to a representation h which is an element $R^{d'}$ this mapped representation may also be referred to as the image vector. A deterministic function of the type $h=f_\theta=\sigma(W_\chi+b)$ with the parameters $\theta'=\{W, b\}$ is used to create the image vector. A decoder NN is then employed to reconstruct the input from the representative image vector by a reverse of f: $y=f_{\theta'}(h)=\sigma(W'h+b')$ with $\theta'=\{W', b'\}$ the two parameters sets may be constrained to the form of $W'=W^T$ using the same weights for encoding the input and decoding the representation. Each training input $\chi_j$ is mapped to its image vector $h_i$ and its reconstruction $y_i$. These parameters are trained by minimizing an appropriate cost function over a training set. A convolutional auto encoder works similar to a basic auto-encoder except that the weights are shared across all of the locations of the inputs. Thus for a monochannel input (such as a black and white image) x, the representation of the k-th feature map is given by $h^k=\sigma(x*W^k+b^k)$ where the bias is broadcasted to the whole map. Variables σ representation an activation function, b represents a single bias which is used per latent map W represents a weight shared across the map, and * is a 2D convolution operator. To reconstruct the input the formula is $$y = \sigma\left(\sum_{k \in H} h^k * \hat{W}^k + C\right)$$

Where there is one bias C per input channel, H identifies the group of feature maps and $\hat{W}$ identifies the flip operation over both dimensions and weights. Further information about training and weighting of a convolutional auto encoder can be found in Masci et al. "Stacked Convolutional Auto-Encoders for Hierarchical Feature Extraction" In IJCANN, pages 52-59. 2011.

As discussed above the auto encoder maps an input $x_i$ to its corresponding representative image vector $h_i$ 203 those image vectors are then provided to a decoder modified for the present invention 204. According to aspects of the present disclosure the encoder and decoder are configured to predict the previous and subsequent frames of the input 205 instead of reconstructing the original input. The output of the decoder according to aspects of the present disclosure is modified from the traditional auto-encoder case by having the network output more channels than it was input. By way of example and not by way of limitation if an RGB 3 channel image of size 100×100 was input the output would be a b×3×100×100 where b in the number of channels corresponding to all the timestamps in the interval {t−W, t+W}. That is, given an input image F at time t the encoder and decoder is trained to predict the images in the interval $F_{\{t-w\}}$ to $F_{\{t+w\}}$ where w is a prediction interval. In other words the training ideal would be to minimize the mean squared error between a predicted previous image $F'_{t-w}$ or subsequent image $F'_{t+w}$ and the actual previous image $F_{t-w}$ or subsequent image $F_{t+w}$ in an image stream $\{F_1, F_2, F_3 \ldots F_T\}$ respectively giving the equation:

$$\frac{1}{T}\sum_{t=1}^{T}(F'_{tw} - F_{tw})^2 \text{ or } \frac{1}{T}\sum_{t=1}^{T}(F'_{t+w} - F_{t+w})^2 \qquad \text{EQ. 1}$$

Thus according to aspects of the present disclosure the encoder NN, ε, generates a k-dimensional vector Φ such that $\Phi=\varepsilon(F_t)$ and the decoder D generates predicted previous $F_{t-w}$ and subsequent images $F_{t+w}$ from the k-th dimensional vector Φ giving:

$$\{F_{t-w}, F_{t+w}\} = D(\Phi) = D(\varepsilon(F_t)) \qquad \text{EQ. 2}$$

Where the decoder is a convolution network with upsampling layers that converts the k-dimensional vector Φ to the output image sequence. Training and optimization of this decoder and encoder neural network system takes advantage of the fact that the training set is an image stream and as such the previous and subsequent images are readily available. The outputs of the decoder, i.e., the predicted previous and subsequent images are compared the corresponding actual previous and subsequent images from the image stream 206. In other words, the predicted image $F'_{t-w}$ is compared to the corresponding actual image at time t-w and the predicted image $F'_{t+w}$ is compared to actual image at time t+w. The difference between the actual image and the predicted image is applied to a loss function such as a mean squared error function, cross entropy loss function etc. The NN is then optimized and trained, as indicated at 207, using the result of the loss function and using known methods of training for neural networks such as backpropagation with stochastic gradient descent.

After many rounds of training the encoder and decoder neural network output correctly predicted previous and subsequent images in an image stream and the loss function has stabilized.

Embodiments of the current disclosure are not limited to those disclosed in the discussion of and may be further modified in a number of was. In some embodiments the predictions are not limited to an immediately previous image in the image stream or an immediate next image in the image stream. The decoder system may be trained to predict any number of images before or after the input image. In some alternative embodiments the input to the encoder and decoder NN may be optimized by selecting certain image points for the NNs to work on or encoding the video using conventional video encoding methods such as, MPEG-2 encoding or H.264 encoding. According to additional aspects of the present disclosure additional tuning of the encoder and decoder system may be carried out by hand manipulation of the number of nodes in a layer or by changing the activation function. Tuning of a convolutional NN may also be performed by changing he weights of certain mask, the sizes of the masks and the number of channels. In fully connected networks the number of hidden units could be changed to tune the network.

Figure 3:
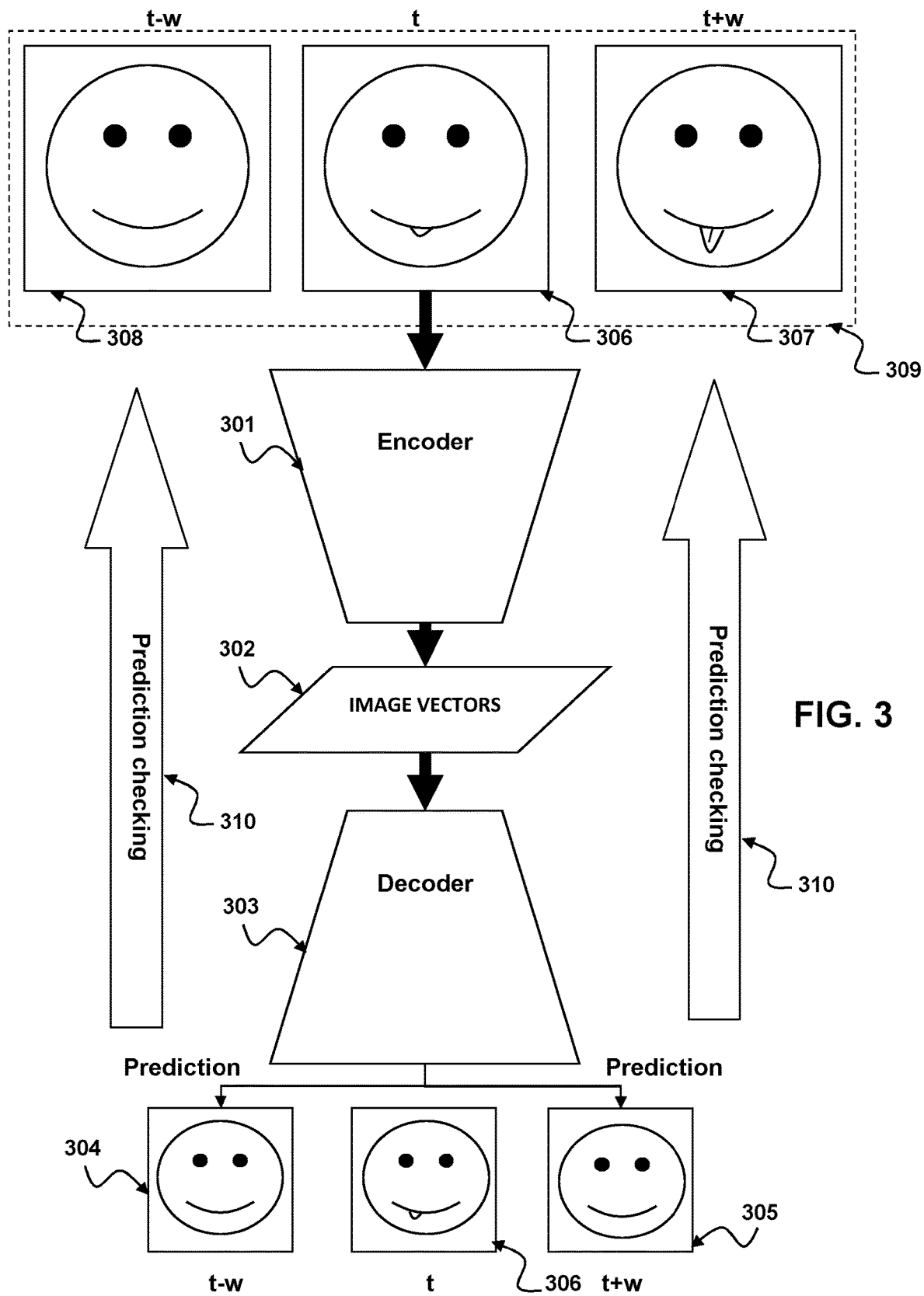
FIG. 3 is a schematic diagram of an auto-encoder training system for detection of image dynamics according to aspects of the present disclosure.

FIG. 3 depicts a block diagram of the encoder 301 that is trained via unsupervised training with a decoder 303. The encoder is provided an input image 306 from an image stream 309 which also contains prior images 308 and/or subsequent images 307. As discussed above the encoder 301 generates a representative image vector 302 which is provided to the decoder 303. The decoder 303 then constructs a prior image $F_{t-w}$ 304 and/or a subsequent image $F_{t+w}$ 305 from the representative image vector of the input image $F_t$ 302. The predictions of a subsequent image 305, and/or a previous image 304 are checked through comparison 310 with the original subsequent image 307 and/or original previous image 308 respectively. As shown the predicted subsequent image 305 differs from the actual subsequent image 307 as the face is sticking out its tongue in the actual image but is not in the predicted image therefore more training would be needed to reach correct result. The result of the comparison is then used for training and optimization of the encoder decoder system as described above. The encoder decoder system is considered to be fully trained when the loss function does not change very much with variation in parameters.

The trained encoder system is of particular interest as it may output fixed feature length vectors. In some embodiments those feature length vectors may be 512 dimensional floating point numbers. These vectors encode contextual information on how the images are likely to be in the near past or future. Thus both feature location and small feature changes are captured by these feature vectors.

Image Dynamic Recognition

Figure 4:
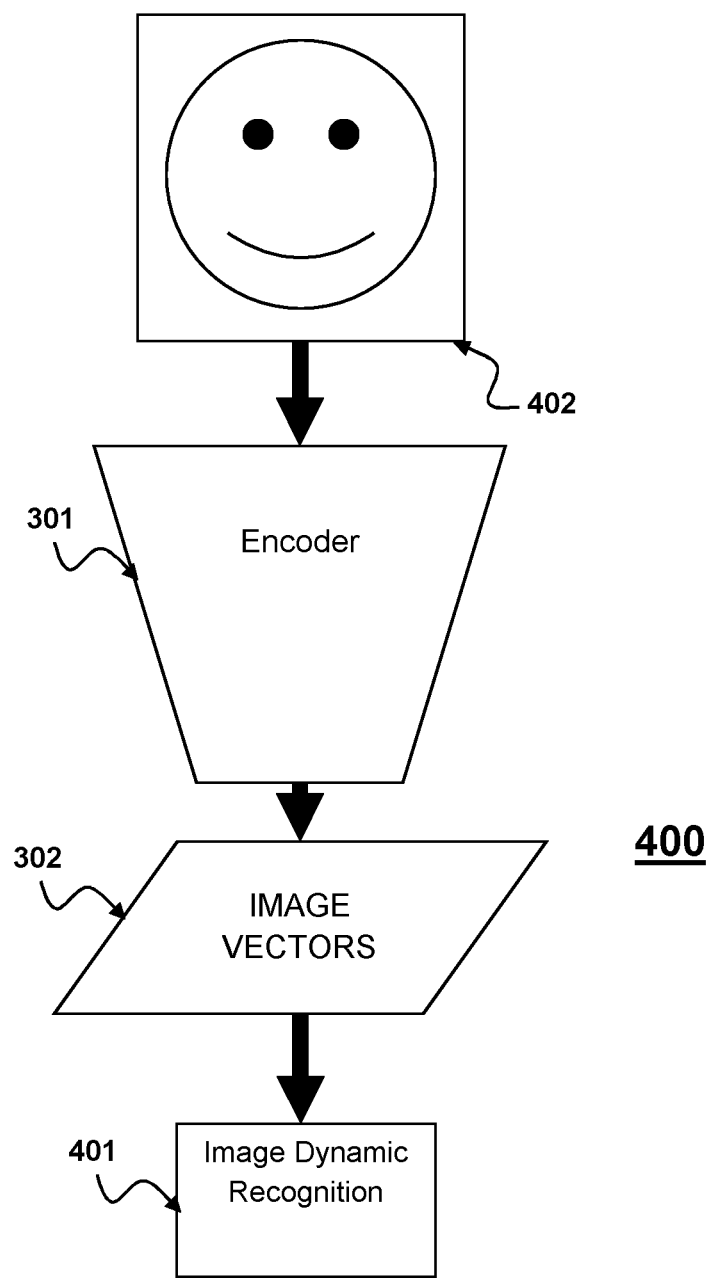
FIG. 4 is a schematic diagram of a system for detection of image dynamics with an auto-encoder according to an aspect of the present disclosure.

As seen in FIG. 4 the decoder may be replaced by a third NN configured to recognize and classify different categories of interest such as expression, pose, etc. from image vectors representing image dynamics 401 to create a classification system which uses image dynamics from a static image 400 according to aspects of the present disclosure. The image vectors 302 generated by the encoder 301 may be used as inputs to the NN configured to classify features from image dynamics. The third NN may be trained independently of the encoder or may be trained using the image vectors from the encoder.

Training of the third NN may be carried out in a method similar to those described above in relation to the encoder and decoder NN. The major difference between the third NN and the decoder NN is that the third NN is trained to classify the image based on image dynamics as opposed to predicting a previous and/or subsequent image. That is, the third NN is trained to perform classification for the image composition from the image vector. By way of example, the third NN may recognize and classify such things as expression, speech, and body pose. In alternative implementations, the third NN may recognize and classify medical related problems within video or specialized medical imaging such as MRI, ultrasound, CAT scan etc. In other alternative implementations the third NN may recognize and classify activities for surveillance operation. In yet another alternative embodiment the third NN may recognize and classify body gestures for human computer interaction systems.

The encoder 301 and third NN configured to recognize features from image dynamics 401 are provided as inputs an image 402 that may be part of an image stream. The system 400 generally operates on a single image 402 to recognize features from image dynamics. The third NN may be of any type known in the art configured for recognition and classification of features within an image from image dynamics.

Figure 5:
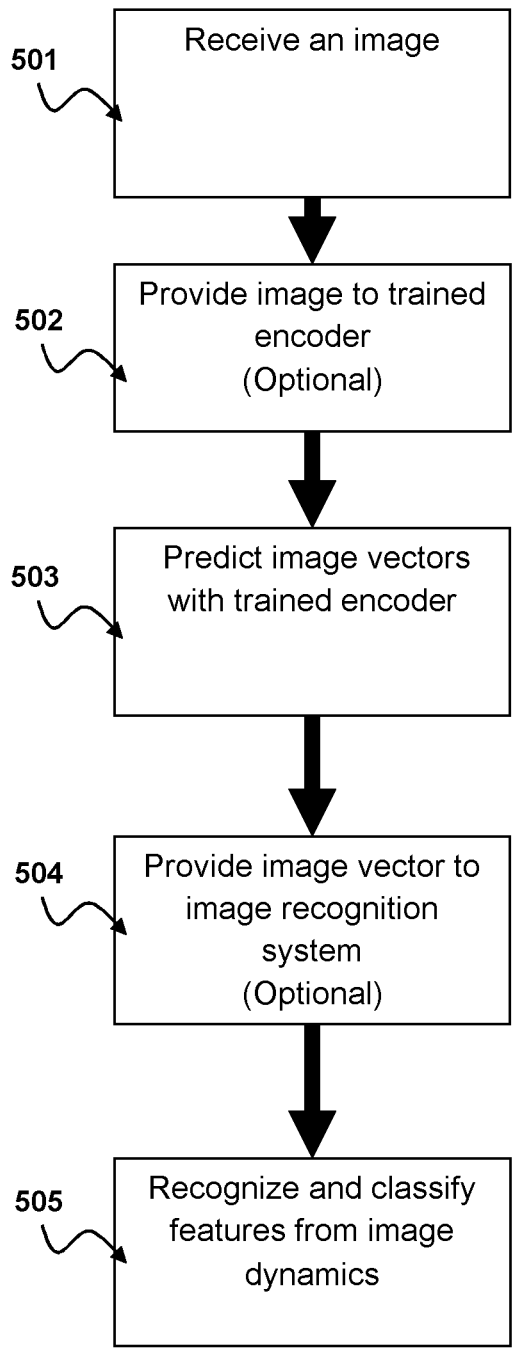
FIG. 5 is a block diagram of a method for detection of image dynamics according to aspects of the present disclosure.

With respect to FIG. 5 a method for recognition and classification of features from image dynamics is described herein. Initially the image feature recognition system 400 may receive a stream of unaltered images 501 which have no pre-defined features or labels. Alternatively the stream of images may be altered slightly to enhance the ability for the system to recognize image dynamic by way of example and not by way of limitation the stream of images may have certain areas selectively chosen for recognition. Alternatively the stream of images may be encoded using conventional encoding methods such as MPEG-2 encoding, H.264 encoding etc. An image from the image stream may then be provided to the trained encoder 502. The trained encoder may then predict image vectors representing image dynamics 503. The Image vectors are provided to third NN configured to recognize and classify features from image dynamics represented by image vectors 504. From the image vectors the third NN recognizes and classifies features from the image dynamics represented by the image vector 505.

Implementation

Figure 6:
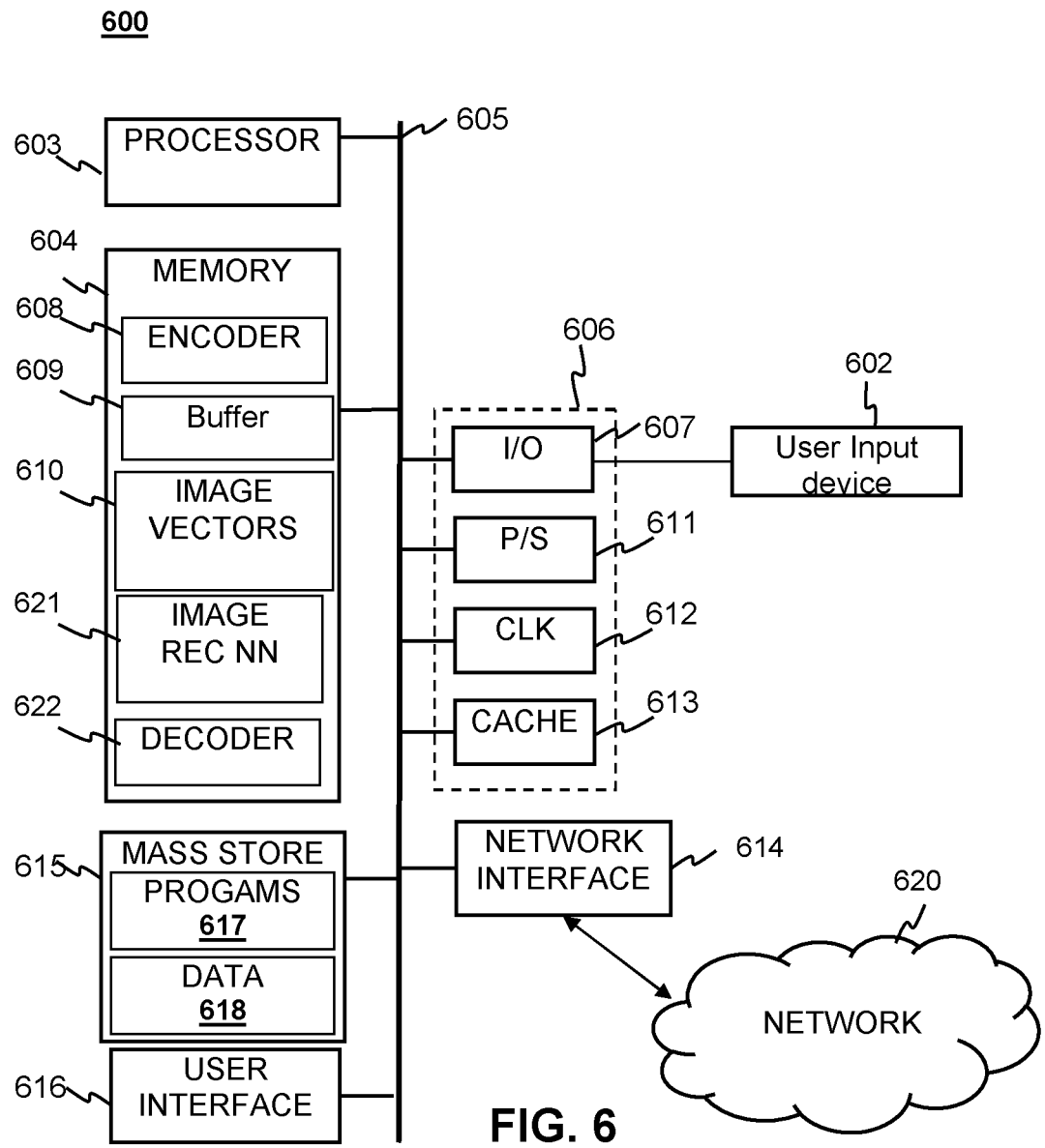
FIG. 6 is a block diagram of a system implementing training and method for detection of image dynamics according to aspects of the present disclosure.

FIG. 6 depicts a system according to aspects of the present disclosure. The system may include a computing device 600 coupled to a user input device 602. The user input device 602 may be a controller, touch screen, microphone, keyboard, mouse, or other device that allows the user to input speech data in to the system.

The computing device 600 may include one or more processor units 603, which may be configured according to well-known architectures, such as, e.g., single-core, dual-core, quad-core, multi-core, processor-coprocessor, cell processor, and the like. The computing device may also include one or more memory units 604 (e.g., random access memory (RAM), dynamic random access memory (DRAM), read-only memory (ROM), and the like).

The processor unit 603 may execute one or more programs, portions of which may be stored in the memory 604 and the processor 603 may be operatively coupled to the memory, e.g., by accessing the memory via a data bus 605. The programs may be configured to implement training of an Encoder 608 and a Decoder 622. Additionally the Memory 604 may contain programs that implement training of an Image Recognition NN 621. The Memory 604 may also contain software modules such as an Encoder Module 608, a Decoder Module 622 and an Image Recognition NN Module 621. The overall structure and probabilities of the NNs may also be stored as data 618 in the Mass Store 615. The processor unit 603 is further configured to execute one or more programs 617 stored in the mass store 615 or in memory 604 which cause processor to carry out the method 200 of training the Encoder 608 and Decoder 622 from an image stream and/or the training an image recognition NN from image vectors 610. The system may generate Neural Networks as part of the NN training process. These Neural Networks may be stored in memory 604 as part of the Encoder Module 608, Decoder Module 622 or the Image Recognition NN Module 610. Completed NNs may be stored in memory 604 or as data 618 in the mass store 615.

The programs 617 (or portions thereof) may also be configured, e.g., by appropriate programming, to encode, un-encoded video or manipulate one or more images in an image stream stored in the buffer 609

The computing device 600 may also include well-known support circuits, such as input/output (I/O) 607, circuits, power supplies (P/S) 611, a clock (CLK) 612, and cache 613, which may communicate with other components of the system, e.g., via the bus 605. The computing device may include a network interface 614. The processor unit 603 and network interface 614 may be configured to implement a local area network (LAN) or personal area network (PAN), via a suitable network protocol, e.g., Bluetooth, for a PAN. The computing device may optionally include a mass storage device 615 such as a disk drive, CD-ROM drive, tape drive, flash memory, or the like, and the mass storage device may store programs and/or data. The computing device may also include a user interface 616 to facilitate interaction between the system and a user. The user interface may include a display device, e.g., a monitor, flat screen, or other audio-visual device.

The computing device 600 may include a network interface 614 to facilitate communication via an electronic communications network 620. The network interface 614 may be configured to implement wired or wireless communication over local area networks and wide area networks such as the Internet. The device 600 may send and receive data and/or requests for files via one or more message packets over the network 620. Message packets sent over the network 620 may temporarily be stored in a buffer 609 in memory 604.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for training a neural network to generate image vectors representing image dynamics, the method comprising:
   a) generating an image vector representing image dynamics from a single image from an image stream using only the single image as an image input to a first neural network;
   b) predicting a previous image and a subsequent image in the image stream from the image vector using a second neural network;
   c) comparing the predicted previous image and subsequent image with an actual previous and/or subsequent image from the image stream;
   d1) training the first and second neural networks using a result of the comparison; and
   e) using the image vector from the fully trained first neural network to train a third neural network to recognize and classify features from image dynamics and classifying features in the single image from the image dynamics.

2. The method of claim 1 further comprising:
d2) repeating a)-d1) until the first and second neural networks are fully trained before using the image vector from the fully trained first neural network to train the third neural network.

3. The method of claim 1 wherein the image vector is a 512 dimensional floating point number.

4. The method of claim 1 wherein the single image and the image stream are medical images.

5. The method of claim 4 wherein the medical images are from specialized medical imaging devices.

6. The method of claim 1 wherein the single image has certain areas selected for extraction of the image vector and the predicting the previous image and the subsequent image.

7. The method of claim 1 wherein the single image and the stream of images have undergone video encoding before being provided to the first neural network.

8. The method of claim 1 wherein the single image dynamic is a small change within the single image.

9. The method of claim 8 wherein the small change is a change in facial expression.

10. A system for training a neural network for recognition of image dynamic, comprising:
a processor;
a memory;
instructions embodied within the memory which when executed cause the processor to carry out a method for training a neural network to generate image vectors representing image dynamics, the method comprising:
a) generating an image vector representing image dynamics from an image from a single image stream using only the single image as an image input to a first neural network;
b) predicting a previous image and a subsequent image in the image stream from the image vector using a second neural network;
c) comparing the predicted previous image and subsequent image with an actual previous and/or subsequent image from the image stream;
d) training the first and second neural networks using a result of the comparison; and
e) using the image vector from the fully trained first neural network to train a third neural network to recognize and classify features from image dynamics and classifying features in the single image from the image dynamics.

11. A system for recognition of image dynamics comprising:
a processor;
a memory;
the fully trained first neural network from claim 1 embodied in a non-transitory medium and configured to generate image vectors representing image dynamics using only a single image taken from an image stream as an image input; and
the fully trained third neural network from claim 1 configured to recognize and classify features from image dynamics.

12. A method for recognition of image dynamics:
a) predicting image vectors representing image dynamics of a single image using only the single image as an image input to the fully trained first neural network from claim 1; and
b) recognizing and classifying image features from the image dynamics represented by image vectors using the fully trained third neural network from claim 1 configured to recognize and classify features from the image dynamics.

13. The system of claim 12 wherein the image vector is a 512-bit floating point number.

14. The system of claim 12 wherein the single image is a medical image.

15. The system of claim 14 wherein the medical image is from a specialized medical imaging device.

16. The system of claim 12 wherein the single image has certain areas selected for extraction of the image vector and the predicting the previous image and the subsequent image.

17. The system of claim 12 wherein the single image has undergone video encoding before being provided to the first neural network.

18. The system of claim 12 wherein the third neural network is further configured to recognize and classify expressions from the single image.

19. The system of claim 12 wherein the third neural network is further configured to recognize and classify medical injuries from the single image.

* * * * *